(12) United States Patent
Mizutani et al.

(10) Patent No.: US 8,063,663 B2
(45) Date of Patent: Nov. 22, 2011

(54) DIFFERENTIAL SIGNAL TRANSMITTING APPARATUS AND DIFFERENTIAL SIGNAL RECEIVING APPARATUS

(75) Inventors: Yasushi Mizutani, Kawasaki (JP);
Kouichi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 485 days.

(21) Appl. No.: 12/166,709

(22) Filed: Jul. 2, 2008

(65) Prior Publication Data

US 2008/0273603 A1 Nov. 6, 2008

Related U.S. Application Data

(63) Continuation of application No. PCT/JP2006/302126, filed on Feb. 8, 2006.

(51) Int. Cl.
*H03K 19/0175* (2006.01)
*H03K 19/00* (2006.01)
*H03K 19/02* (2006.01)
*H03K 3/00* (2006.01)

(52) U.S. Cl. .............................. 326/82; 326/56; 327/108

(58) Field of Classification Search ............. 326/56–58, 326/68, 82, 83, 86, 87; 375/219; 327/108, 327/170
See application file for complete search history.

(56) References Cited

U.S. PATENT DOCUMENTS

| | | | | |
|---|---|---|---|---|
| 6,304,106 B1 * | 10/2001 | Cecchi et al. | | 326/86 |
| 6,418,500 B1 * | 7/2002 | Gai et al. | | 710/305 |
| 6,615,301 B1 * | 9/2003 | Lee et al. | | 710/106 |
| 6,639,423 B2 * | 10/2003 | Martin et al. | | 326/30 |
| 6,690,196 B1 * | 2/2004 | Cecchi et al. | | 326/82 |
| 7,750,666 B2 * | 7/2010 | Zhang et al. | | 326/30 |
| 2007/0085562 A1 * | 4/2007 | Nguyen et al. | | 326/30 |
| 2007/0285120 A1 * | 12/2007 | Venditti et al. | | 326/30 |

FOREIGN PATENT DOCUMENTS

| | | |
|---|---|---|
| JP | 06-097967 | 4/1994 |
| JP | 2001-169314 | 6/2001 |
| JP | 2002-051088 | 2/2002 |

OTHER PUBLICATIONS

International Search Report dated Apr. 25, 2006 in corresponding International Application No. PCT/JP2006/302126 (9 pages).
English Translation of the International Preliminary Report on Patentability issued Aug. 12, 2008 in corresponding International Patent Application PCT/JP2006/302126.

* cited by examiner

*Primary Examiner* — Shawki S Ismail
*Assistant Examiner* — Dylan White
(74) *Attorney, Agent, or Firm* — Staas & Halsey LLP (57) ABSTRACT

A differential signal transmitting apparatus for transmitting a differential signal through two transmission lines. The apparatus includes: transmitting-side board connecting terminals that are provided for each of the transmission lines, and are able to connect a transmitting circuit for transmitting a differential signal; receiving circuit connecting terminals that are provided at a far end of a daisy-chain connection extending from the transmitting-side board connecting terminals provided for each of the transmission lines, and connect the receiving circuit for receiving the differential signal; and an undefined-logic preventing circuit that is connected at a near end of the daisy-chain connection and outputs a prescribed potential difference to the receiving circuit connecting terminals when the transmitting circuit is not connected to the transmitting circuit connecting terminals.

4 Claims, 6 Drawing Sheets

RELATED ART

DIFFERENTIAL SIGNAL TRANSMITTING APPARATUS AND DIFFERENTIAL SIGNAL RECEIVING APPARATUS

TECHNICAL FIELD

This application is a continuation of International Application No. PCT/JP2006/302126, filed Feb. 8, 2006, the disclosure of which is herein incorporated in its entirety by reference. The present invention relates to a differential signal transmitting apparatus and a differential signal receiving apparatus, each designed to perform the transmission of differential signals.

BACKGROUND ART

In order to transmit high-frequency signals such as clock signals, the differential signal transmission is utilized, in which two signals of different polarities are transmitted.

Figure 7:
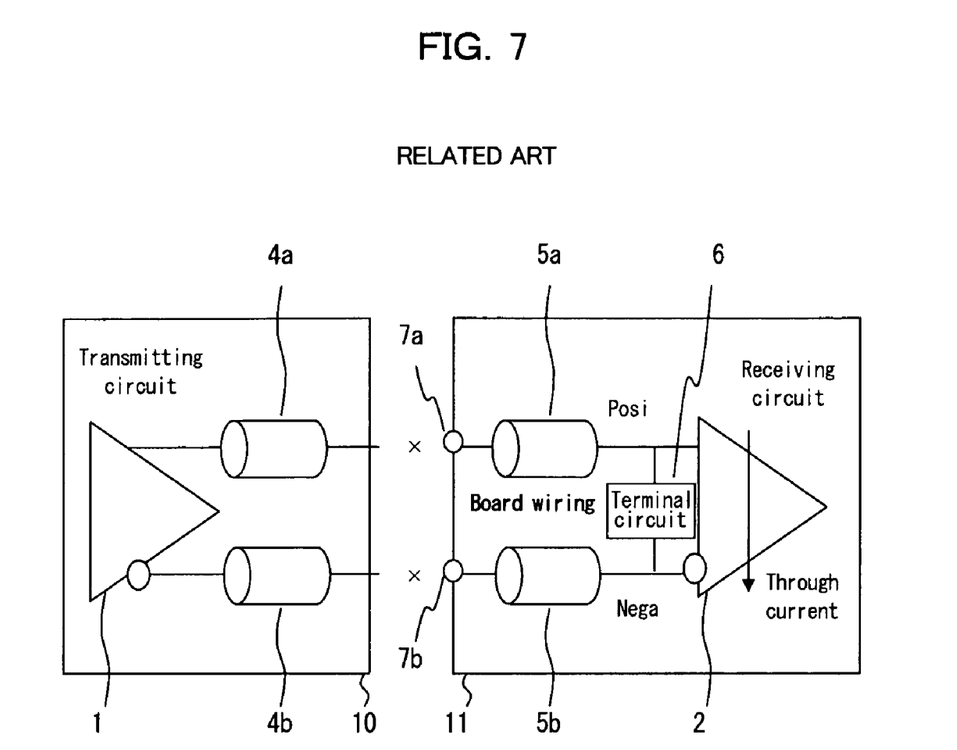
FIG. 7 is a circuit diagram showing an example of the conventional differential signal transmitting apparatus.

FIG. 7 is a circuit diagram showing an example of the conventional differential signal transmitting apparatus. The differential signal transmitting apparatus has a transmitting-side board 10 and a receiving-side board 11. The transmitting-side board 10 has a transmitting circuit 1, a transmission line 4a (positive side), and a transmission line 4b (negative side). The receiving-side board 11 has a receiving circuit 2, a transmission line 5a (positive side), a transmission line 5b (negative side), a matching-termination circuit 6, a transmitting-side board connecting terminal 7a (positive side), and a transmitting-side board connecting terminal 7b (negative side). The transmitting circuit 1 and the receiving circuit 2 are each constituted by, for example, a large scale integrated (LSI) circuit.

While the transmitting-side board 10 remains connected to the receiving-side board 11 via the transmitting-side board connecting terminals 7a and 7b, the positive signal included in the differential signal transmitted from the transmitting circuit 1 is input to the positive side of the receiving circuit 2 via the transmission line 4a, transmitting-side board connecting terminal 7a, transmission line 5a and the positive side of the matching-termination circuit 6. Similarly, the negative signal included in the differential signal transmitted from the transmitting circuit 1 is input to the negative side of the receiving circuit 2 via the transmission line 4b, transmitting-side board connecting terminal 7b, transmission line 5b and the negative side of the matching-termination circuit 6.

As shown in this figure, in the differential signal transmitting circuit, the transmitting circuit 1 and the receiving circuit 2 are mounted on different boards, and transmission lines 5a and 5b and the matching-termination circuit 6 are mounted on the receiving-side board 11. In the differential signal transmitting circuit, the positive and negative sides of the receiving circuit 2 are set to the same potential, rendering the differential potential of the circuit 2 undefined, if the transmitting circuit 1 is disconnected from the receiving circuit 2 because of the expansion slots. In this case, a through current may flow in the receiving circuit 2 or an undefined logic state may propagate into the receiving circuit 2. Consequently, a logic problem may arise.

The undefined logic can be avoided if the receiving circuit is a single-end receiving circuit merely by connecting a pull-up resistor of high resistance or a pull-down resistor of high resistance to the input. However, the undefined logic cannot be avoided in the differential signal transmitting circuit if the matching-termination circuit 6 is provided on the differential signal receiving side.

As a conventional technique related to the present invention, a circuit is available, in which a selector connects a pull-up resistor and a pull-down resistor to the positive and negative sides of the differential input of the receiving circuit when the transmitting circuit is found not connected, and disconnects these resistors from the differential input when the transmitting circuit is found not connected. (See, for example, Patent Document 1.)

Patent Document 1: Jpn. Pat Appln. Laid-Open Publication No. 2001-169314

DISCLOSURE OF THE INVENTION

Problems to be Solved by the Invention

With the technique disclosed in Patent Document 1, however, it is necessary to use a dedicated external circuit having the function of a selector or the like, or to use a receiving circuit having the function of a selector or the like. This may increase the cost.

The present invention has been made to solve the problem described above. An object of the invention is to provide a differential signal transmitting apparatus and a differential signal receiving apparatus, in which the receiving circuit to and from which the transmitting circuit can be connected and disconnected is prevented from malfunctioning.

Means for Solving the Problems

To solve the above-mentioned problem, a differential signal transmitting apparatus according to the present invention transmits a differential signal through two transmission lines. The apparatus includes: transmitting circuit connecting terminals that are provided for each of the transmission lines, and can connect a transmitting circuit for transmitting the differential signal; receiving circuit connecting terminals that are provided at a far end of a daisy-chain connection extending from the transmitting circuit connecting terminals provided for each of the transmission lines, and connect a receiving circuit for receiving the differential signal; and a potential-difference output circuit that is connected to a near end of the daisy-chain connection extending from the transmitting circuit connecting terminals provided for each of the transmission lines, and output a prescribed potential difference to the receiving circuit connecting terminals when the transmitting circuit is not connected to the transmitting circuit connecting terminals.

The differential signal transmitting apparatus according to the present invention is characterized in that the potential-difference output circuit increases an output impedance at the receiving circuit connecting terminals when the transmitting circuit is connected to the transmitting circuit connecting terminals.

The differential signal transmitting apparatus according to this invention further includes a transmitting circuit detecting unit, which is connected to the transmitting circuit, together with the transmitting circuit connecting terminals, and outputs a signal indicating whether the transmitting circuit is connected to the transmitting circuit connecting terminals by acquiring a signal from the transmitting circuit and, the potential-difference output circuit switches the output to the receiving circuit connecting terminals in accordance with a signal supplied from the transmitting circuit detecting unit.

The differential signal transmitting apparatus according to the present invention is characterized in that the potential output circuit includes enable buffers provided for each of the transmission lines, and receives fixed logics as input signals of the buffers and receives a signal from the transmitting circuit detecting unit as an enable signal, and the enable buffers become enabled when the transmitting circuit is not connected to the transmitting circuit connecting terminals.

The differential signal transmitting apparatus according to the present invention is characterized in that the enable buffers are tri-state buffers.

The differential signal transmitting apparatus according to the present invention is characterized in that the enable buffers are bi-directional buffers.

A differential signal receiving apparatus according to the present invention receives a differential signal through two transmission lines. The apparatus includes: transmitting circuit connecting terminals that are provided for each of the transmission lines, and can connect a transmitting circuit for transmitting the differential signal; a receiving circuit that is provided at a far end of a daisy-chain connection extending from the transmitting circuit connecting terminals provided for each of the transmission lines, and receives the differential signal; and a potential-difference output circuit that is connected to a near end of the daisy-chain connection extending from the transmitting circuit connecting terminals provided for each of the transmission lines, and outputs a prescribed potential difference to the receiving circuit connecting terminals when the transmitting circuit is not connected to the transmitting circuit connecting terminals.

The differential signal receiving apparatus according to the present invention is characterized in that the potential-difference output circuit increases an output impedance at the receiving circuit connecting terminals when the transmitting circuit is connected to the transmitting circuit connecting terminals.

The differential signal receiving apparatus according to the present invention further includes a transmitting circuit detecting unit, which is connected to the transmitting circuit, together with the transmitting circuit connecting terminals, and outputs a signal indicating whether the transmitting circuit is connected to the transmitting circuit connecting terminals by acquiring a signal from the transmitting circuit and, the potential-difference output circuit switches the output to the receiving circuit connecting terminals in accordance with a signal supplied from the transmitting circuit detecting unit.

The differential signal receiving apparatus according to the present invention is characterized in that the potential output circuit includes enable buffers provided for each of the transmission lines, and receives fixed logics as input signals of the buffers and receives a signal from the transmitting circuit detecting unit as an enable signal, and the enable buffers become enabled when the transmitting circuit is not connected to the transmitting circuit connecting terminals.

The differential signal receiving apparatus according to the present invention is characterized in that the enable buffers are tri-state buffers.

The differential signal receiving apparatus according to the present invention is characterized in that the enable buffers are bi-directional buffers.

BEST MODE FOR CARRYING OUT THE INVENTION

Now, preferred embodiments of the present invention will be described by referring to the accompanying drawings.

First, the configuration of a differential signal transmitting apparatus according to this embodiment will be described.

Figure 1:
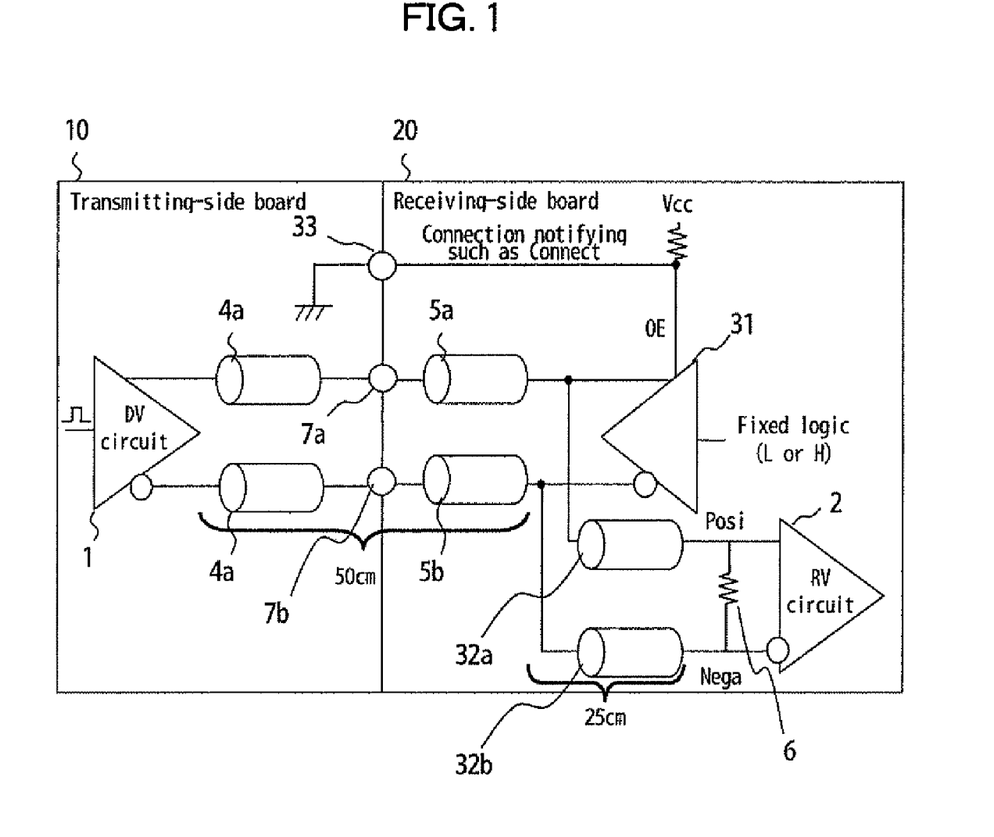
FIG. 1 is a circuit diagram showing an example of the configuration of a differential signal transmitting apparatus according to the embodiment.

FIG. 1 is a circuit diagram showing an example of the configuration of the differential signal transmitting apparatus according to this embodiment. In FIG. 1, the components identical or equivalent to those shown in FIG. 7 are designated by the same reference numerals. The component identical or equivalent will not be described here. Unlike the apparatus of FIG. 7, the apparatus of FIG. 1 has a receiving-side board 20, in place of the receiving-side board 11. Unlike the receiving-side board 11, the receiving-side board 20 has some additional components, i.e., an undefined-logic preventing circuit 31, a transmission line 32a (positive side), a transmission line 32b (negative side), and a transmitter-side detecting terminal 33.

An undefined-logic preventing circuit 31 is connected to the near end of the daisy-chain connection extending from transmitting-side board connecting terminals 7a and 7b, and a matching-termination circuit 6 and a receiving circuit 2 are connected to the far end thereof via the transmission lines 32a and 32b.

The transmitter-side detecting terminal 33 is used as a connection notifying signal such as connect. In this instance, the terminal 33 is held at a prescribed potential as long as the transmitting-side board 10 remains not connected to it. When the transmitting-side board 10 is connected to it, the transmitter-side detecting terminal 33 is set to the ground potential.

Figure 2:
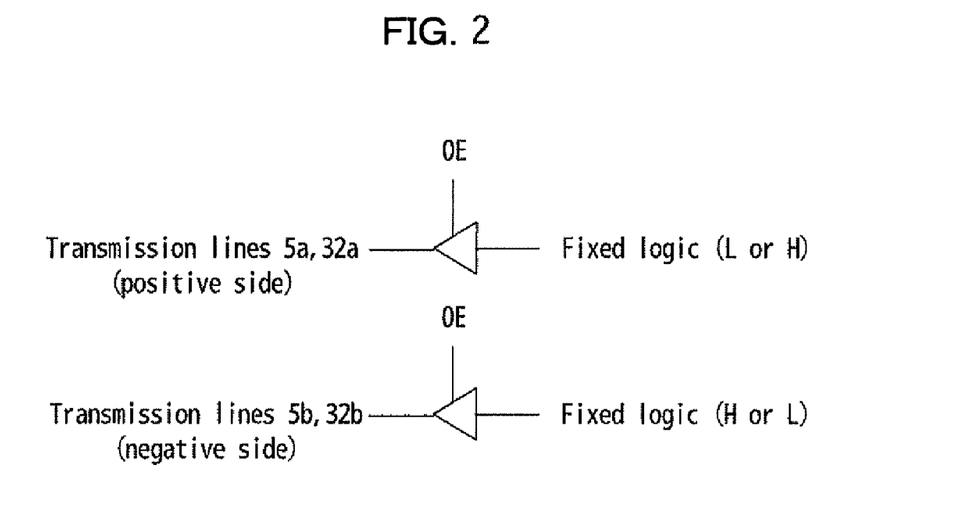
FIG. 2 is a circuit diagram showing an example of an undefined-logic preventing circuit that has a tri-state buffer.
Figure 3:
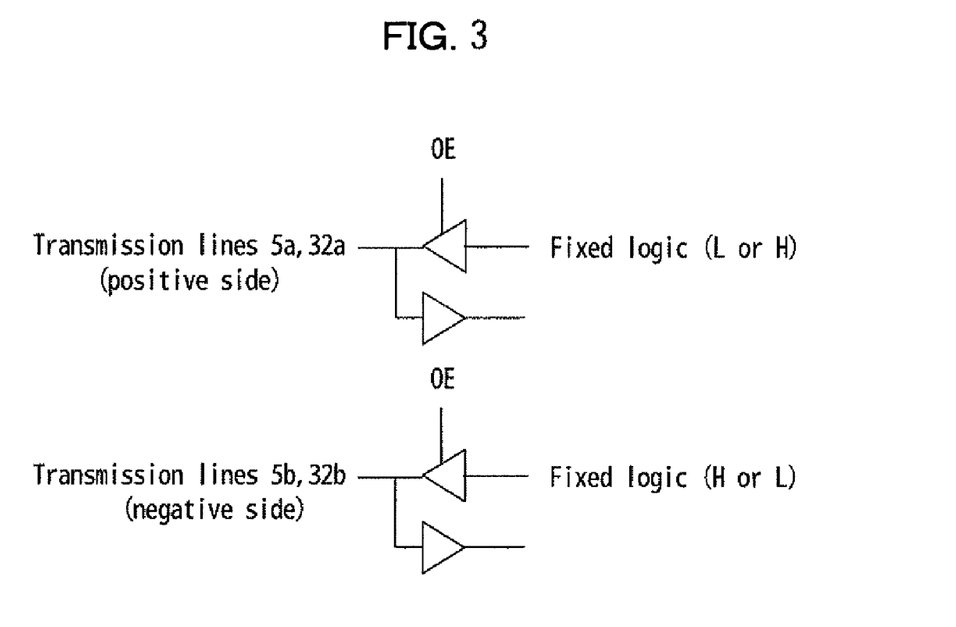
FIG. 3 is a circuit diagram showing an example of an undefined-logic preventing circuit that has a bi-directional buffer.

The undefined-logic preventing circuit 31 is implemented by a tri-state buffer or a bi-directional buffer. These buffers can be disabled or enabled by an output enable (OE) signal, which is a control signal. FIG. 2 is a circuit diagram showing an example of the undefined-logic preventing circuit 31 that has a tri-state buffer. FIG. 3 is a circuit diagram showing an example of the undefined-logic preventing circuit that has a bi-directional buffer.

If the OE signal is enabled, the undefined-logic preventing circuit 31 outputs a prescribed potential from the left, in accordance with a predetermined fixed logic input from the right. When two different fixed logics are input for the positive side and the negative side, respectively, the circuit 31 inputs a prescribed potential difference to the receiving circuit 2. On the other hand, if the OE signal is disabled, the impedance from the left (output) becomes high, and the undefined-logic preventing circuit 31 is electrically disconnected from the left-side transmission line.

The operation of the differential signal transmitting apparatus will be explained below.

When power is supplied to the receiving-side board 20 and the transmitting-side board 10 is not connected to the receiving-side board 20, the transmitter-side detecting terminal 33 is not connected and therefore has a prescribed potential. The undefined-logic preventing circuit 31 therefore becomes enabled. As a result, the undefined-logic preventing circuit 31 outputs a prescribed potential difference in accordance with the fixed logic input. The potential difference is therefore imparted to the input of the receiving circuit 2 so that the undefined logic is avoided.

When the transmitting-side board 10 is connected to the receiving-side board 20, the transmitter-side detecting terminal 33 is connected to the ground of the transmitting-side board 10. The OE signal is thereby set to the ground potential. The undefined-logic preventing circuit 31 is therefore inverted to be disabled. As a result, the output impedance of the undefined-logic preventing circuit 31 becomes high impedance. The undefined-logic preventing circuit 31 is therefore electrically disconnected.

The waveform of the input to the receiving circuit 2, which has been determined by simulation, will be explained next.

Figure 4:
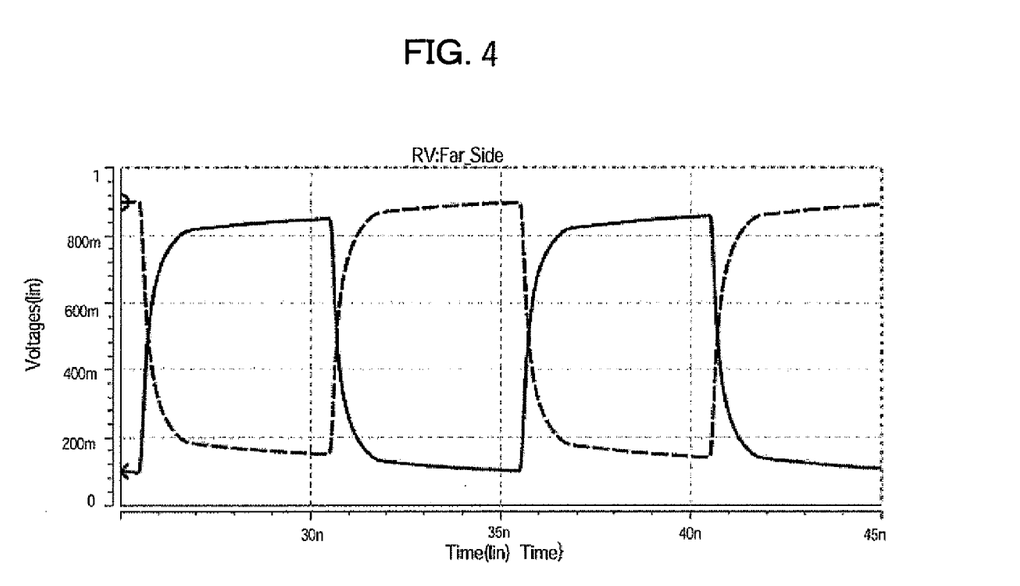
FIG. 4 is a waveform of an input to the receiving circuit according to the embodiment, which is acquired by simulation.

The waveform of the input to the receiving circuit 2 provided in the differential signal transmitting apparatus shown in FIG. 1 was simulated, on the assumption that the transmission lines 4a and 4b are 50 cm long and that the transmission lines 32a and 32b are 25 cm long. FIG. 4 shows the result of this simulation, i.e. the waveform of an input to the receiving circuit 2 according to the embodiment. The solid line indicates the waveform of the input to the positive side, and the broken line indicates the waveform of the input to the negative side. As seen from this diagram, the input to the receiving circuit 2 acquires a good waveform in the differential signal transmitting apparatus according to the present embodiment.

The result of simulation, in which the undefined-logic preventing circuit 31 was connected in a different manner, will be explained.

Figure 5:
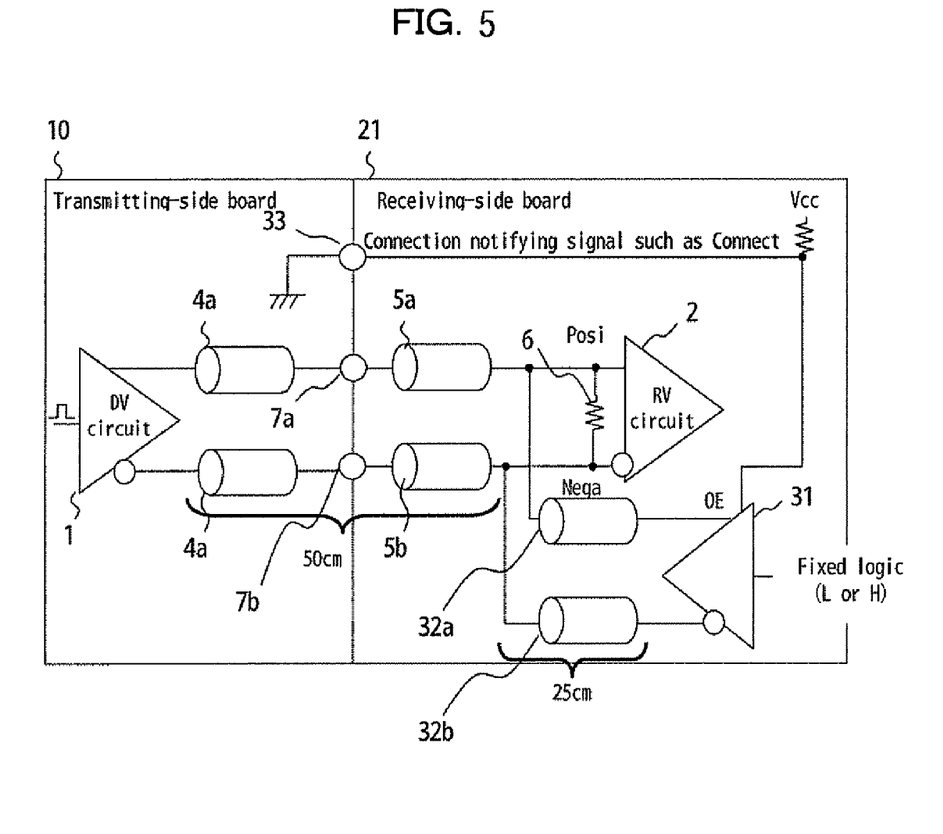
FIG. 5 is a circuit diagram showing an example of a differential signal transmitting apparatus in which the undefined-logic preventing circuit is connected in a different manner.

FIG. 5 is a circuit diagram showing an example of a differential signal transmitting apparatus in which the undefined-logic preventing circuit 31 is connected in a different manner. In FIG. 5, the components identical or equivalent to those shown in FIG. 1 are designated by the same reference numerals. The component identical or equivalent will not be described here. Unlike the apparatus of FIG. 1, the apparatus of FIG. 5 has a receiving-side board 21 in place of the receiving-side board 20. The receiving-side board 21 is different from the receiving-side board 20, in that the matching-termination circuit 6 and receiving circuit 2 are connected at the position of the undefined-logic preventing circuit 31 and that the undefined-logic preventing circuit 31 is connected at the position of the matching-termination circuit 6 and receiving circuit 2.

That is, the matching-termination circuit 6 and receiving circuit 2 are connected to the near end of the daisy-chain connection extending from the transmitting-side board connecting terminals 7a and 7b, and the undefined-logic preventing circuit 31 is connected to the far end thereof via the transmission lines 32a and 32b.

Figure 6:
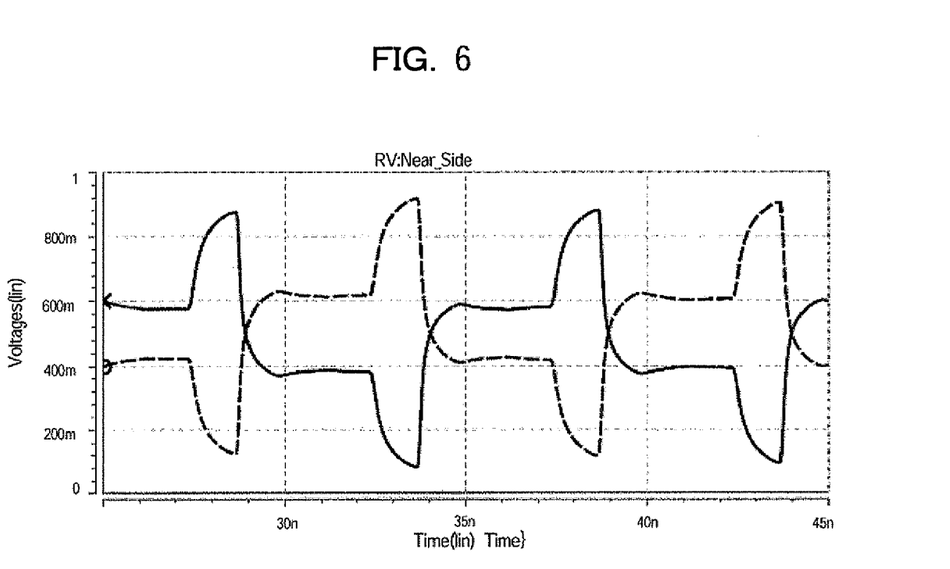
FIG. 6 is a waveform acquired by simulation, which an input to the receiving circuit 2 has if the undefined-logic preventing circuit is connected in a different manner.

The waveform of the input to the receiving circuit 2 provided in the differential signal transmitting apparatus shown in FIG. 5 was simulated, on the assumption that the transmission lines 4a and 4b are 50 cm long and that the transmission lines 32a and 32b are 25 cm long as in the apparatus of FIG. 1. FIG. 6 is a waveform acquired by simulation, which an input to the receiving circuit 2 has if the undefined-logic preventing circuit is connected in a different manner. In FIG. 6, the solid line indicates the waveform of the input to the positive side, and the broken line indicates the waveform of the input to the negative side, as in FIG. 4. In this differential signal transmitting apparatus in which the undefined-logic preventing circuit 31 is connected to the far end of the daisy-chain connection, the input to the receiving circuit 2 acquires a waveform that is deformed as shown in FIG. 6, because the wiring extending from the receiving circuit 2 to the undefined-logic preventing circuit 31 works as an antenna, inevitably generating a reflection noise. In order to reduce this reflection noise, a matching-termination circuit may be connected to the undefined-logic preventing circuit 3, too. In this case, two matching-termination circuits are connected, and levels of the signal waveform cannot be ensured.

A problem, such as transmission of reflection noise, does not arise in the present embodiment. This is because the undefined-logic preventing circuit 31 is connected to the near end of the daisy-chain connection extending from the transmitting-side board connecting terminals 7a and 7b, and the receiving circuit 2 is connected to the far end of the daisy-chain connection extending from the transmitting-side board connecting terminals 7a and 7b.

The differential signal transmitting apparatus according to the present embodiment can be easily adapted to the transmission of high-frequency signals, e.g., clock signals, in information processing apparatuses, and can enhance the performance of the information processing apparatuses. The information processing apparatuses include servers, work stations and personal computers.

The transmitting circuit connecting terminal corresponds to the transmitting-side board connecting terminals used in the embodiments. The receiving circuit corresponds to the receiving circuit and matching-termination circuit that are used in the embodiments. Further, the potential-difference output circuit corresponds to the undefined-logic preventing circuit used in the embodiments. The transmitting circuit detecting unit corresponds to the transmitter-side detecting terminal used in the embodiments.

INDUSTRIAL APPLICABILITY

As has been described above, the present invention can prevent a receiving circuit from malfunctioning, to and from which a transmitting circuit can be connected and disconnected.

The invention claimed is:

1. A differential signal receiving apparatus to be connected to a circuit board which has a transmitting circuit for receiving a differential signal, the differential signal receiving apparatus comprising:

a pair of connecting terminals that are configured to be connected to a pair of terminals of the transmitting circuit;

a receiving circuit for receiving the differential signal transmitted from the transmitting circuit;

a pair of transmission lines, wherein a first part of the pair of transmission lines are connected to the pair of connecting terminals and a second part of the pair of transmission lines are connected to a pair of terminals of the receiving circuit;

a detecting terminal that is connected to the circuit board in response to a connection between the pair of terminals of the transmitting circuit and the pair of connecting terminals, and outputs a signal indicating whether the pair of terminals of the transmitting circuit are connected to the pair of connecting terminals; and a potential-difference output circuit that is connected to a third part of the pair of transmission lines, which is placed in between the first part and second part of the pair of transmission lines, switches an output to the third part of transmission lines in accordance with the signal outputted from the detecting terminal, and outputs a prescribed potential difference to the third part of the pair of transmission lines when the signal outputted from the detecting terminal indicates that the pair of terminals of the transmitting circuit are not connected to the pair of connecting terminals, wherein the potential-difference output circuit comprises enable buffers provided for each of the pair of transmission lines, receives fixed logic signals as input signals of the enable buffers, and receives the signal outputted from the detecting terminal as an enable signal, and the enable buffers become enabled when the enable signal indicates that the pair of terminals of the transmitting circuit are not connected to the pair of connecting terminals.

2. The differential signal receiving apparatus according to claim 1, wherein the potential-difference output circuit increases output impedance of the potential-difference output circuit when the signal outputted from the detecting terminal indicates that the pair of terminals of the transmitting circuit are connected to the pair of connecting terminals.

3. The differential signal receiving apparatus according to claim 1, wherein the enable buffers are tri-state buffers.

4. The differential signal receiving apparatus according to claim 1, wherein the enable buffers are bidirectional buffers.

* * * * *